A. FUTTERMAN.
GAS HEATED WELDING TOOL.
APPLICATION FILED APR. 29, 1908.
898,864.
Patented Sept. 15, 1908.
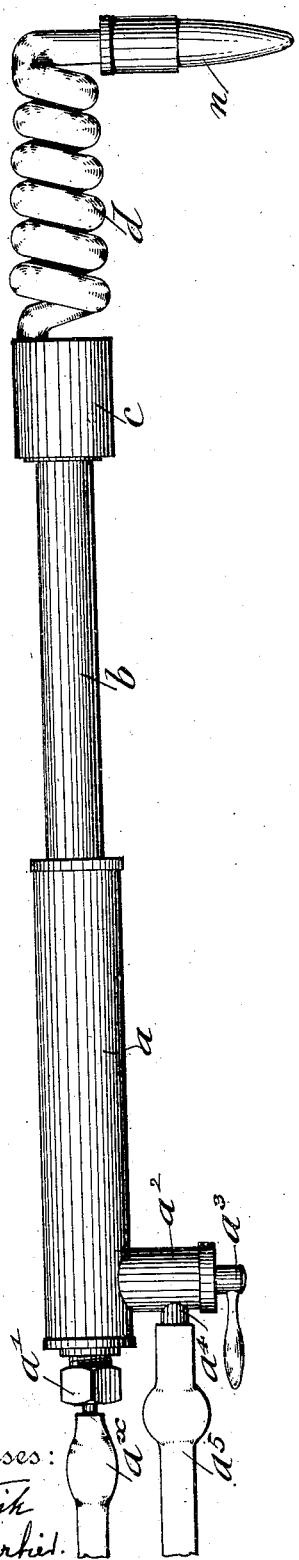
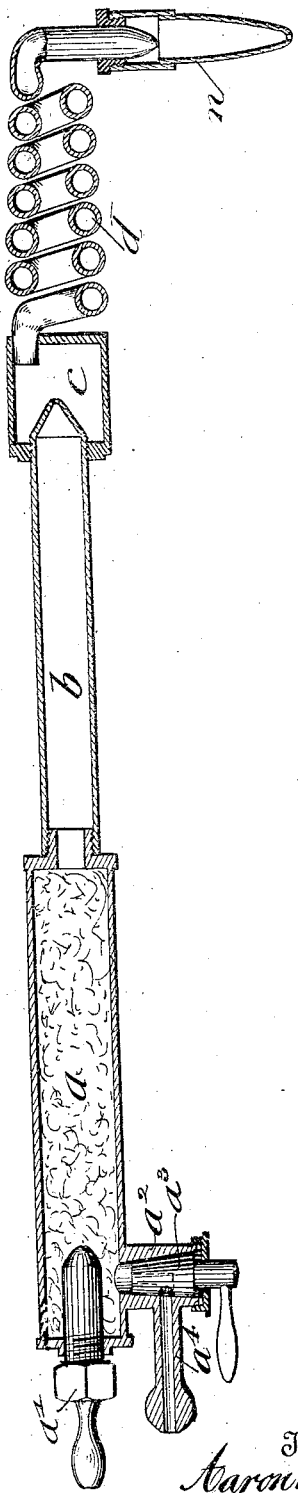

UNITED STATES PATENT OFFICE.

AARON FUTTERMAN, OF NEW YORK, N. Y.

GAS-HEATED WELDING-TOOL.

No. 898,864.

Specification of Letters Patent.   Patented Sept. 15, 1908.

Application filed April 29, 1908.   Serial No. 429,859.

*To all whom it may concern:*

Be it known that I, AARON FUTTERMAN, a citizen of the United States of America, residing at New York, in the borough of the Bronx, county and State of New York, have invented certain new and useful Improvements in Gas-Heated Welding-Tools, of which the following is a specification.

This invention relates to an improved tool for welding iron and other metals by a mixture of illuminating gas and oxygen flame so that a great many welding operations can be performed; and for this purpose the invention consists of a welding tool comprising a mixing chamber, means for supplying illuminating gas and oxygen to said mixing chamber, a stopcock for regulating the supply of illuminating gas to the mixing chamber, a second mixing chamber, and a coil connected with the auxiliary mixing chamber, said coil being provided with a nozzle at the end, as will be fully described hereinafter and finally pointed out in the claim.

In the accompanying drawings, Figure 1 represents a side-elevation of my improved welding tool, and Fig. 2 is a vertical longitudinal section of the same.

Similar letters of reference indicate corresponding parts.

Referring to the drawings, $a$ represents the mixing chamber of my improved welding tool in which a mixture of illuminating gas and oxygen is used. The mixing chamber is filled in the usual manner with asbestos fibers, and provided at one end with a nipple $a^1$ to which a hose $a^x$ for the oxygen is applied, and with a short lateral stud-pipe $a^2$ having a stop-cock $a^3$ and connected with a supply-pipe $a^4$ to which the hose $a^5$ for the illuminating gas is applied. Axially in line with the mixing chamber is arranged a pipe $b$, which is screwed at one end to a short nipple at the head of the mixing chamber $a$ and at the other end into a second shorter mixing chamber $c$. To the opposite end of the chamber $c$ is connected a coil-pipe $d$ to the end of which is applied a nozzle $n$, which is located at right angles to the axis of the mixing chamber $c$ and coil $d$.

The coil $d$ is heated by convection from the nozzle $n$ and serves to heat up the mixture of illuminating gas and oxygen in its passage through the coil, so that the mixture of gas is burned at a higher temperature than when burned in non-heated state. The coil serves therefore as a heater for the gas mixture, in addition to mixing the gases intimately during their passage through the convolutions of the coil. The coil preferably diminishes in diameter from the end adjacent to the auxiliary mixing chamber $c$ towards the opposite end to which the nozzle is applied.

The improved welding tool is adapted for metals which do not require an extra high temperature for welding, and has the advantage that it can be operated with ordinary illuminating gas in connection with a fountain containing oxygen under pressure, which can be bought in the open market. The welding tool is specially adapted for welding brass and other alloys and for other work, and it is especially useful for manufacturers of automobiles, motor-cycles and the like as many of the parts can be directly welded together by the illuminating gas and oxygen flame.

Having thus described my invention, I claim as new and desire to secure by Letters Patent:

A welding tool comprising a mixing chamber provided with means for receiving illuminating gas and oxygen, an auxiliary smaller mixing chamber, a tube connecting the two mixing chambers, and a heating coil connected with the smaller mixing chamber and having a nozzle to which all the gaseous mixture received in said smaller mixing chamber is carried by said coil.

In testimony, that I claim the foregoing as my invention, I have signed my name in presence of two subscribing witnesses.

AARON FUTTERMAN.

Witnesses:
PAUL GOEPEL,
HENRY J. SUHRBIER.